(12) United States Patent
Shan et al.

(10) Patent No.: US 8,290,880 B2
(45) Date of Patent: Oct. 16, 2012

(54) SYSTEM AND METHOD FOR ESTIMATING A PARAMETER THAT REPRESENTS DATA DESCRIBING A PHYSICAL SYSTEM

(75) Inventors: Jerry Z. Shan, Palo Alto, CA (US); Fereydoon Safai, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 391 days.

(21) Appl. No.: 12/427,924

(22) Filed: Apr. 22, 2009

(65) Prior Publication Data

US 2010/0274642 A1 Oct. 28, 2010

(51) Int. Cl.
- *G06F 17/00* (2006.01)
- *G06G 7/00* (2006.01)
- *G06Q 10/00* (2006.01)
- *G06Q 30/00* (2012.01)

(52) U.S. Cl. .............. 705/400; 705/7.11; 705/7.35

(58) Field of Classification Search .............. None
See application file for complete search history.

(56) References Cited

U.S. PATENT DOCUMENTS

| | | | |
|---|---|---|---|
| 6,839,680 B1 | 1/2005 | Liu et al. | |
| 6,978,249 B1 | 12/2005 | Beyer | |
| 7,058,590 B2 | 6/2006 | Shan | |
| 7,133,848 B2 * | 11/2006 | Phillips et al. | 705/400 |
| 7,200,505 B2 | 4/2007 | Shan | |
| 7,200,604 B2 | 4/2007 | Forman | |
| 7,321,865 B2 * | 1/2008 | Kelly et al. | 705/7.35 |
| 7,403,640 B2 | 7/2008 | Zhang | |
| 7,493,280 B2 | 2/2009 | Guler | |
| 7,505,868 B1 | 3/2009 | Shan | |
| 7,627,495 B2 * | 12/2009 | Mathews et al. | 705/7.31 |
| 7,630,986 B1 * | 12/2009 | Herz et al. | 1/1 |
| 7,644,863 B2 * | 1/2010 | Chen et al. | 235/385 |

(Continued)

OTHER PUBLICATIONS

Kevin Frick, "Sensitivity Analysis and Inference—Lecture 12", 2007, available at http://ocw.jhsph.edu/courses/Concepts Economic Evaluation/PDFs/Lecture12.pdf.*

(Continued)

*Primary Examiner* — Ryan Zeender
*Assistant Examiner* — Allen Chein (57) ABSTRACT

There is provided a system and method for estimating a parameter that represents data describing a physical system. An exemplary method comprises randomizing data representative of a population of items for which the parameter is known. The method may additionally comprise generating data representative of a pseudo population of items using a known perturbation, the data representative of the pseudo population of items being included with the data representative of the population of items for which the parameter is known to form a revised population and selecting a bootstrap sample of a minimum sample size of the revised population. A sensitivity study is performed on the parameters of the items comprising the bootstrap sample to determine a level of change of a predicted parameter value relative to a parameter value of the sample. At least one of a range, a probability distribution or the minimum sample size is revised based on the parameter for items comprising the bootstrap sample to produce at least one of a revised range, a revised probability distribution or a revised minimum sample size, taking into account an effect of the known perturbation applied to the pseudo population. The steps of selecting, performing and revising are repeated until the sensitivity study indicates that the level of change of the parameter is acceptably small. A value of the parameter is estimated for the population based on a parameter corresponding to the acceptably small level of change.

11 Claims, 6 Drawing Sheets

U.S. PATENT DOCUMENTS

| | | |
|---|---|---|
| 2002/0143665 A1 | 10/2002 | Santos |
| 2002/0174052 A1 | 11/2002 | Guler |
| 2003/0018501 A1 | 1/2003 | Shan |
| 2003/0055773 A1 | 3/2003 | Guler |
| 2003/0101449 A1 | 5/2003 | Bentolila et al. |
| 2005/0091267 A1 | 4/2005 | Zhang |
| 2005/0096866 A1 | 5/2005 | Shan |
| 2005/0177598 A1 | 8/2005 | Hao |
| 2005/0182780 A1 | 8/2005 | Forman |
| 2005/0207491 A1 | 9/2005 | Zhang |
| 2006/0074817 A1 | 4/2006 | Shan |
| 2006/0116830 A1 | 6/2006 | Shan |
| 2006/0116920 A1 | 6/2006 | Shan |
| 2006/0116921 A1 | 6/2006 | Shan |
| 2008/0065559 A1 | 3/2008 | Zhang |
| 2008/0126176 A1 | 5/2008 | Iguchi |
| 2009/0024407 A1 | 1/2009 | Shan |
| 2009/0024427 A1 | 1/2009 | Shan |
| 2009/0024444 A1 | 1/2009 | Shan |
| 2009/0024445 A1 | 1/2009 | Shan |
| 2009/0024446 A1 | 1/2009 | Shan |

OTHER PUBLICATIONS

Fran Turisco,"Evaluating ASP Pricing Models and Contract Terms—application service providers", Aug. 2000, available at http://findarticles.com/p/articles/mi_m3257/is_8_54/ai_64459017/.*

Sander Greenland and Ronald Christensen, "Data augmentationpriors for Bayesianan d semi-Bayes analyses of conditional-logistic and proportional-hazards regression", 2001, Statist. Med., vol. 20. pp. 2421-2428.*

Russell Davidson James G. MacKinnon, "Bootstrap Tests: How Many Bootstraps?", Mar. 2001, available at http://qed.econ.queensu.ca/faculty/mackinnon/papers/many.pdf.*

Roy T. St. Laurent and R. Dennis Cook, "Leverage, Local Influence and Curvature in Nonlinear Regression", Mar. 1993, Biometrika, vol. 80, No. 1, pp. 99-106.*

Stephen M. S. Lee and G. Alastair Young, "Prepivoting by weighted bootstrap iteration", 2003, Biometrika (2003), 90, 2, pp. 393-410, available at http://www2.imperial.ac.uk/~ayoung/papers/393.pdf.*

Shan, J. Z., "Sequential sampling for pricing consistency of enterprise IT solutions with attached services," presented at the 2008 Joint Statistical Meetings in Denver, Colorado (Jul. 31-Aug. 7, 2008).

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: The Collective Intelligence Platform, Online, http://www.baynote.com/technology/platform/ 2010.

Hottolink Inc.; "Recognize" Online, http://www.hottolink.co.jp/english/reconize.html, 2009.

Andrejko et al.: User Characteristics Acquisition from Logs with Semantics 8. Slovak University of Technology in Bratislava.

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda An Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; A Framework for Efficient and Anonymous Web Usage Mining Based on Client-Side Tracking, 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

SYSTEM AND METHOD FOR ESTIMATING A PARAMETER THAT REPRESENTS DATA DESCRIBING A PHYSICAL SYSTEM

BACKGROUND

Large companies and other organizations tend to rely on a networked information technology (IT) infrastructure to conduct day-to-day operations. In many cases, the IT infrastructure is extremely large and complex. Such IT enterprise infrastructures may include a bundled combination of services and hardware. In the case of a complex networked IT infrastructure, a service provider who installs and maintains the system could have procedures that allow recognition of service value only when services are actually completed. Moreover, complex network infrastructures could represent multiple element arrangements for certain business purposes. The service provider may only be able to recognize service value for each element in the networked IT infrastructure. In systems having a large number of elements, service value recognition may present a complex challenge for a service provider.

While pricing can vary among the elements, the pricing consistency is an important factor in achieving certain strategic business objectives. A service element (as compared to a hardware element) might have two components. Those two components are the service rate that is charged when the service is sold, and the number of hours needed to complete the service in the multiple-element arrangement.

While IT enterprises in general are expected to have the ability to establish a reasonably dependable estimate of the number of hours required to complete the services, there are some factors that significantly affect the service rates that the IT service providers would charge. One such factor is that labor rates could be negotiated in special arrangements by customers and IT service providers based on perceived value of the services. Another factor is that labor rates may be renegotiated if a project is extended or additional resources are required. Yet another factor is that different business units in an IT enterprise could in general have different market focuses, covering everything from off-site support, on-site repair-as-needed support, customized program and solutions management or the like. Labor rates, therefore, while essentially the same across the services for comparable skill levels, vary greatly depending on what skill level is needed. Yet another factor that can affect service rates is transaction volume. Service rates may increase for enterprises with relatively large transaction volumes.

Another complicating factor is that transaction volumes can be different across different regions of a common IT infrastructure. For example, a global enterprise may have a high transaction volume in a particular country and a relatively low transaction volume in another country. It may be necessary to take a population of transactions from countries with a certain percentage of service value of a global business unit. With that consideration, site-services transactions could be extracted using various reporting tools for the selection of all significant countries.

Another factor making analysis of when services are completed for purposes of service value recognition difficult is that available time to process data could be relatively limited. In addition, a recent trend in IT infrastructure management is toward shifting programs to focus on standardization of job architectures across all business units in a global IT enterprise. To accommodate standardization, additional services could be required, making determination of when services are completed more difficult.

Pricing consistency may be inferred from a verification of sales discounts across a large enterprise. This is true because discounts remain relatively constant even though pricing may be significantly different for different parts of the enterprise. A known method for verification of IT service sales discounts is based on transaction level checking through a manual process. Such a process is tedious, and has significant associated costs in time and labor. If the time window is limited to perform such a manual transaction-level checking process, the verification delay would cause delays in financial reporting as well as service value recognition deferment and cash flow interruption.

In addition, manual analysis may not be practical if a large number of transactions is involved. By way of example, the cost of analyzing about 100,000 transactions could exceed up to $750,000.00 and require a time period of about three months.

Statistical sampling methods have not been systematically studied and utilized for the purpose of determining sales discounts across a large enterprise. In terms of statistical sampling methods and development, the traditional methods would assume a Gaussian distribution for the discount amount and compute for the required minimum sample size, based on certain confidence coverage requirement such as the sample mean is within a certain prescribed range of the population mean. One problem here is the distributional assumption: the discount amounts in general would change significantly from one transaction record to the next, depending on the underlying business transaction nature, and a single Gaussian distribution assumption is likely to be invalid.

An alternative approach is to assume a probability distribution for the discount rate, which falls in the [0, 1] interval. This approach may not produce acceptable results if no known sample data exists. Without known sampling data, information derived regarding sample sizes from the standard or the relaxed distributional assumption and the corresponding sample size determination framework are not reliable. Another problem occurs when the transaction population is heavily heterogeneous, and a forced single distribution assumption would yield a large variability (for example, variance) in the distribution when estimated. This could result in a sample size range that is not practically useful. Also, a vague probability inference about the estimation may result.

If an IT enterprise cannot establish an acceptable pricing consistency for bundled combinations of services and hardware, service value recognition may be delayed. This could result in an undesirable delay in service value collection, which in turn could have a detrimental effect on cash flow. Moreover, an acceptable estimate of service rates (or equivalently, the discount rates from the standard pricing) must take into account the presence of all the aforementioned challenging factors, and arrive at an efficient pricing consistency checking method that can be accepted and used in a timely manner.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

In accordance with an exemplary embodiment of the present invention, a sequential and adaptive multi-stage sampling and estimation method is used for sample size determination and sample selection. A method in accordance with an exemplary embodiment of the present invention uses limited information about a population available at an initial stage, determines the required minimum sample size, and selects the initial sample elements. With the enhanced information from the collected sample elements, the estimates of the underlying population characteristics and the minimum sample size are updated. A method in accordance with an exemplary embodiment of the present invention also employs a bootstrap resampling method in which pseudo population elements are generated in such a way that they resemble important aspects to the original population elements but with a known perturbation to reflect the remaining uncertainty about the population. Resampling is performed on an iterative basis until a sensitivity study determines whether changes in an estimate of a parameter describing the population are acceptably small. When the sensitivity study indicates that changes in the estimate of the parameter are acceptably small, the estimate may be used to predict a value such as a cost discount or the like.

Figure 1:
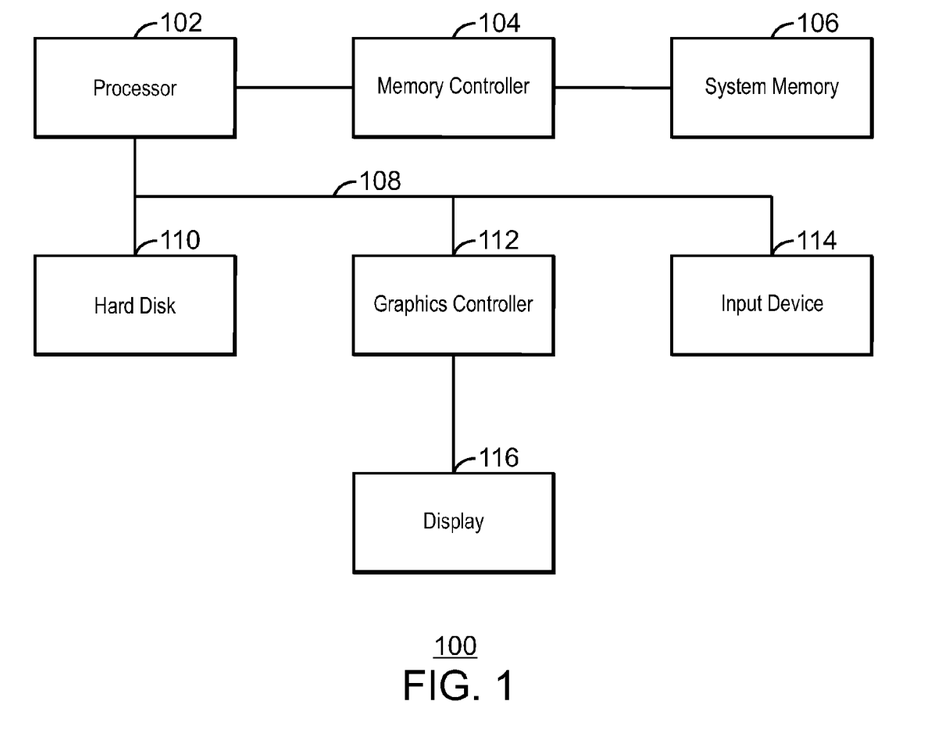
FIG. 1 is a block diagram of a computer system that is adapted to provide an estimate of a parameter that represents data describing a physical system according to an exemplary embodiment of the present invention.

FIG. 1 is a block diagram of a computer system that is adapted to provide an estimate of a parameter that represents data describing a physical system according to an exemplary embodiment of the present invention. Those of ordinary skill in the art will appreciate that the computer system 100 may comprise hardware elements including circuitry, software elements including computer code stored on a machine-readable medium or a combination of both hardware and software elements. Additionally, the functional blocks shown in FIG. 1 are but one example of functional blocks that may be implemented in an exemplary embodiment of the present invention. Those of ordinary skill in the art would readily be able to define specific functional blocks based on design considerations for a particular computer system.

A processor 102, such as a central processing unit or CPU, is adapted to control the overall operation of the computer system 100. The processor 102 is connected to a memory controller 104, which is adapted to read data to and write data from a system memory 106. The memory controller 104 may comprise memory that includes a non-volatile memory region and a volatile memory region.

The system memory 106 may be comprised of a plurality of memory modules, as will be appreciated by one of ordinary skill in the art. In addition, the system memory 106 may comprise non-volatile and volatile portions. A system basic input-output system (BIOS) may be stored in a non-volatile portion of the system memory 106. The system BIOS is adapted to control a start-up or boot process and to control the low-level operation of the computer system 100.

The processor 102 is connected to at least one system bus 108 to allow communication between the processor 102 and other system devices. The system bus may operate under a standard protocol such as a variation of the Peripheral Component Interconnect (PCI) bus or the like. In the exemplary embodiment shown in FIG. 1, the system bus 108 connects the processor 102 to a hard disk drive 110, a graphics controller 112 and at least one input device 114. The hard disk drive 110 provides non-volatile storage to data that is used by the computer system. The graphics controller 112 is in turn connected to a display device 116, which provides an image to a user based on activities performed by the computer system 100.

As set forth in detail below, the computer system 100 may be programmed to perform parameter estimation according to an exemplary embodiment of the present invention. The memory devices of the computer system 100, including the system memory 106 and the hard disk 110 may comprise tangible, machine-readable media that store computer-readable instructions to cause the processor 102 to perform a method according to an exemplary embodiment of the present invention.

In one exemplary embodiment of the present invention, the computer system 100 may be adapted to estimate a parameter corresponding to a physical system. One example of such a parameter is a discount rate for combinations of hardware and services in a large IT infrastructure such as a global computer network. Those of ordinary skill in the art will appreciate that a discount rate for a large number of transactions correlates to price consistency, which may be used to determine when service value for providing system hardware and services may be recognized by a service provider.

As set forth in greater detail below, a system and method in accordance with the present invention solves a pricing consistency problem using a multiple-stage, sequential statistical sampling approach. The overall designing idea is to develop a method that can efficiently collect a sample from a large population for which very little data is initially known. A sample that is desirably as representative as possible of the population, yet the size of the sample small enough to allow efficient data collection and estimation of pricing consistency in a timely manner. In addition, it is desirable for the sample size to be sufficiently large to produce an estimate that is acceptably accurate.

In accordance with an exemplary embodiment of the present invention, an initial estimation is made for a range of expected parameter values of a population. In a pricing consistency application, the range of values could correspond to a discount rate. In an exemplary embodiment of the present invention, the likelihood range is an interval, specified with a coverage probability (the likelihood), which states that there is a certain probability (for example, 90%) that the discount rates are within a given interval (for example, from 0.01 to 0.75). In addition, a predicted probability distribution is estimated. A sample size is chosen based on the expected parameter range and probability distribution.

Given the fact that no sample values may be initially available, the initial estimations represent a practical modeling step. As explained herein, the initial estimates are modified based on sampled data from the population. Those of ordinary skill in the art will appreciate that using a discount rate as a predictor of price consistency rather than the original service rate is that the former is a variable confined in the 0-1 interval.

This makes the discount rate easier to model than the overall service rate, which can be of any non-negative value. Ideally, the likelihood range with its coverage probability should be derived from empirical data. However, if availability of such empirical data is a practical issue, then the likelihood range can be specified based on field operators' experience and forward-looking expectations. In either case, an exemplary embodiment of the present invention could determine a Bayesian prior distribution for the discount rate.

In an exemplary embodiment of the present invention, the probability distribution chosen is a Beta distribution. The determination of the prior distribution entails estimating the necessary parameters for the distribution from the likelihood range specification. Those of ordinary skill in the art will appreciate that a Beta probability distribution is defined by two parameters ($\alpha$ and $\beta$), and one equation that is based on the probability coverage will not be able to provide the complete estimation solution. To address this deficiency, another equation based on practical considerations may be established. To establish this equation, the mean of the Beta distribution may be defined to be the center of the specified likelihood range. Using two equations, it is possible to solve for the two parameters that describe the Beta distribution.

Figure 2:
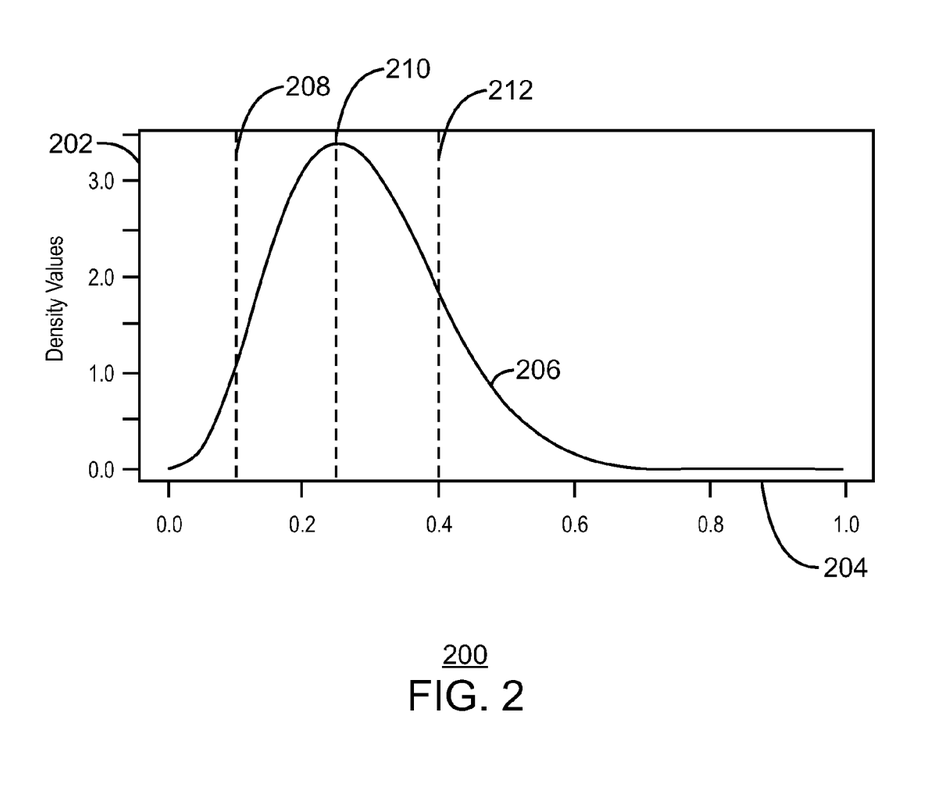
FIG. 2 is a graph that shows a beta distribution model based on a specified likelihood range according to an exemplary embodiment of the present invention.

FIG. 2 is a graph that shows a Beta distribution model based on a specified likelihood range according to an exemplary embodiment of the present invention. The graph is generally referred to by the reference number 200. The graph 200 shows a y-axis 202, which corresponds to density and an x-axis 204, which corresponds to a discount rate value between 0 and 1. A trace 206 represents the Beta distribution of a population expressed as a density function.

A first dashed vertical line 208 represents a lower end of a likelihood range. A second dashed vertical line 210 represents a middle point of the likelihood range. A third dashed vertical line 212 represents an upper end of the likelihood range.

Based on the mean level specification of the density function by a middle point (the middle dashed line) of the likelihood range and the specified coverage probability (the area under the density function curve and between the left most and right most dashed lines), a Beta distribution corresponding to the trace 206 may be identified by determining the $\alpha$ and $\beta$ parameters of the density function. Those of ordinary skill in the art will appreciate that the values of $\alpha$ and $\beta$ may be determined using a numerical computation approach, as there is no closed form for the parameter solutions, except in trivial cases.

Using the parameters that define the Beta distribution and a specified population (for example, a transaction volume, each transaction having an associated discount rate), an initial sample size may be determined. The sample size determination is based on an expected estimation accuracy of the population mean by the sample mean, with a control on the likelihood for the sample mean to be within a prescribed precision level (for example, 5%) of the population mean, at any given confidence level (for example, 95%). Specifically, the sample size design criterion is for the mean of sample charge rates (charge rate=1−discount rate) to be within certain percentage of the mean of the population charge rates. Denoting the population size by N, the population mean by $\bar{y}_U$, the sample mean by $\bar{y}$, the relative precision level by $\epsilon$, and the confidence level by $1-\alpha$, we have for the sample size design:

$$P\{(1-\bar{y}_U)(1-\epsilon) \leq 1-\bar{y} \leq (1-\bar{y}_U)(1+\epsilon)\} = 1-\alpha,$$

which is equivalent to $$P\left(\left|\frac{\bar{y} - \bar{y}_U}{1 - \bar{y}_U}\right| \leq \epsilon\right) = 1 - \alpha.$$

The required minimum sample size, therefore, can be derived and expressed by $$n^* = \frac{(z_{1-\alpha/2} CV(1-y))^2}{\epsilon^2 + (z_{1-\alpha/2} CV(1-y))^2 / N}$$

where $CV(1-y)$ is the coefficient of variation of random variable $(1-y)$.

Prior to obtaining a sample of discount rate data from the population of transactions, data corresponding to the population is first randomized. Randomization of the population data is performed to eliminate or at least reduce any pre-existing bias for the transaction listing. Moreover, randomization ensures the representativeness of sampled data, with the required minimum sample size. Thereafter, a random sample of the minimum sample size of transactions is obtained from the population. In particular, the actual service rates and, equivalently, the discount rates are obtained for the selected transactions through a costly manual and elaborative process.

In a global enterprise, it may be desirable to obtain representative data from a plurality of countries. In such a case, the country level can be used as a stratification variable while performing stratified sampling. In an exemplary embodiment of the present invention, country discount percentages (derived from either historical data or from sample observations, or from the combined consideration) are weighted according to their population size allocation as well as the sample size allocation. For each country, once a sample size and a population size are specified, random sampling is performed within the country. The stratified sampling can additionally be applied beyond the country level.

To avoid the bias effect of over-representative of certain sub-population that sometimes goes with the usual stratified sampling, an additional aggregation step is performed. Specifically, if the variability in several countries in a specific region is very limited, then pooling together the countries in the region is considered. Based on the pooled data, randomization and sampling are performed. In this manner, the sample size and the sampling cost are effectively saved.

After the initial sample has been selected and the discount rate data has been determined for each transaction sampled, the effectiveness of the model probability distribution represented by the Beta distribution is evaluated. The process of sampling and model evaluation is performed iteratively until the model representing the probability distribution is sufficiently accurate with respect to the sampled data. When this convergence between predicted discount rate values and sampled discount rate values occurs, the final probability distribution may be used to predict an overall discount rate for the population. When the discount rate indicates that a sufficient level of services indicative of a desired level of price consistency have been performed, service value may be recognized by a service provider.

If the sampled data indicates an insufficient degree of correlation between the probability distribution model and the observed data, model parameters may be adjusted to improve the degree of correlation in a successive iteration. In an exemplary embodiment of the present invention, model parameters that may be adjusted comprise at least one of a range, a probability distribution or the minimum sample size. One way of adjusting model parameters is to use the new data and perform a new estimation. Another way of adjusting model parameters is through a Bayesian modeling and inference process. As set forth above, the original Beta distribution of discount rate is a prior probability distribution. With the observed sample values, a posterior distribution can be derived and used as a prior distribution for any subsequent model validation work.

In determining an estimated discount rate for a population of transactions, some sampled discount rates may have negative signs. This means that, instead of getting a discount, the customer agreed to pay a premium rate for a premium service. As one example, a customer may be willing to pay extra to have certain services performed in an expedited manner. If discount rates having negative signs were not anticipated during the range specification stage, the cases of positive discount rates may be modeled separately from the cases of negative discount rates. In addition, cases in which the discount rate is zero may also be modeled separately. For the negative value subset, the signs may be changed before applying the formulation and solution for the positive value subset. For the zero value subset, a ratio may be set that represents the sample size for zero discount rate transactions so that the representation of those transactions in the population is maintained. Moreover, the same approach could be used with the negative value subset. A conservative approach is to use the larger sample size from the positive value derivation and negative value derivation.

After an effective discount rate for the population is estimated as set forth above, a sensitivity study may be performed to determine a level of change of the predicted discount rate value relative to a previously-predicted value. When the change of the predicted discount rate values between iterations becomes sufficiently small (convergence), the most recently predicted value of the discount rate is determined to accurately represent the entire population.

In an exemplary embodiment of the present invention, a bootstrap sampling method is used when sampling the population of transactions. As used herein, the term "bootstrap sampling" refers to a practice of estimating properties of an estimator such as the Beta probability distribution described herein by measuring those properties when sampling from an approximating distribution. In addition, a method according to an exemplary embodiment of the present invention generates data corresponding to a pseudo population using a known perturbation such as noise. The pseudo population of elements is included with the population of transactions. The use of pseudo population elements is that little information about the population is known, other than the total population size and the observed samples. If the normal bootstrap method is employed (without adding pseudo population members), sampling of the population with replacement could provide a possible view of the whole population. Nonetheless, any sampling method is likely to introduce some degree of error relative to the population as a whole. That is, there is a good likelihood that the remaining elements in the population are quite different from the observed sample. This likelihood increases as the sample size decreases.

The deviation introduced by the typical bootstrap resampling approach (without the inclusion of pseudo population members) leads to potential inaccuracy between the observed sample and the remaining part of the population. This results in a need to plan for the subsequent sampling given the deviation. Using a known perturbation to create pseudo population members allows the performance of sensitivity studies for the subsequent sample size determination in a controllable way. Moreover, the known perturbation should produce predictable changes in the results of subsequent sensitivity studies. If a subsequent sensitivity study responds as it should based on the addition of the pseudo population, model parameters have a higher likelihood of representing the population as a whole. If a subsequent sensitivity study responds in an unexpected way based on the addition of the pseudo population members, model parameters have a lower likelihood of representing the population as a whole. Moreover, the possible deviation of the unobserved sample values from the observed ones can have a material impact on the required sample size for an acceptable estimation.

Figure 3:
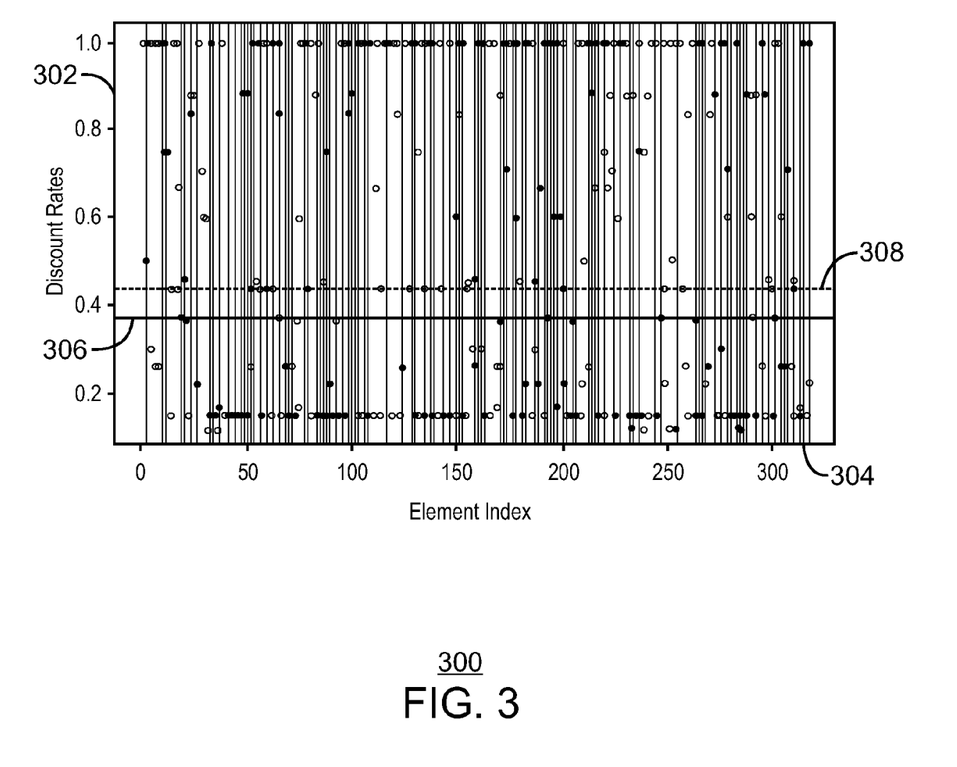
FIG. 3 is a graph that shows a scatter plot of a sample generated by a bootstrap method with added noise according to an exemplary embodiment of the present invention.

FIG. 3 is a graph that shows a scatter plot of a sample generated by a bootstrap method with added noise according to an exemplary embodiment of the present invention. The scatter plot is generally represented by the reference number 300. The graph 300 shows a y-axis 302, which represents a discount rate in the range between 0 and 1. An x-axis 304 represents an element index.

In one exemplary embodiment of the present invention, a random sample of the population size is drawn with replacement from the original observed sample, and a certain level of random noise is added to the sample. The graph 300 shows the results from adding the pseudo-sample observations through the bootstrap resampling. The solid circle dots in the graph 300 are original sample points, and the empty circle dots are the added pseudo-sample points, which are bootstrapped from the original sample with added noise. In the data shown in FIG. 3, the noise was generated by a Gaussian process with a mean level shift and also a variance change, which is a multiple of the variance of the original sample. In general, when the multiplier is zero, then effectively, there is no noise added at all. When the multiplier is 1, then effectively, the variability has been doubled. In FIG. 3, a solid horizontal line 306 indicates the mean of the observed sample, while a dotted horizontal line 308 indicates the mean for the pseudo population. As can be seen from the graph 300, there is a mean level shift from the sample to the pseudo population. Based on this level shift, various sensitivity studies can be performed on the sample sizes.

For each run in generating the pseudo population, the population coefficient of variation (CV) value and the sample size formula are used in deriving the minimum sample size. With different runs, different sample size values are obtained. In order to arrive at a stable sample size that will yield acceptable results, running averages may be derived. As the simulation size gets larger and larger, the running average of the sample sizes gets more and more stable. With certain stabilization criterion, the stabilized value as the final sample size may be used. This is further illustrated in FIG. 4.

Figure 4:
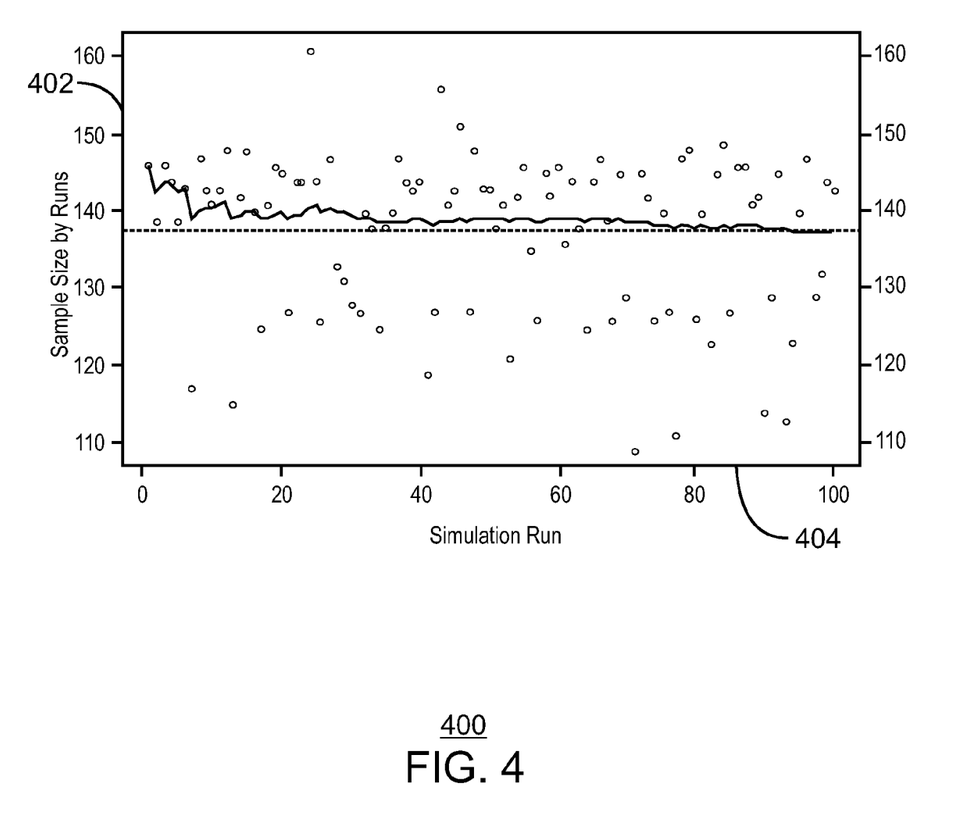
FIG. 4 is a graph showing sample sizes from individual simulation runs and convergence according to an exemplary embodiment of the present invention.

FIG. 4 is a graph showing sample sizes from individual simulation runs and convergence according to an exemplary embodiment of the present invention. The graph is generally referred to by the reference number 400. A y-axis 402 represents a sample size and an x-axis 404 represents a number of simulation runs. The graph 400 represents the process of sequential sample size adjustment. Each time predictive model parameters are updated the minimum sample size is re-calculated. If the updated minimum sample size is no larger than that of the observed sample, it may be concluded that further sampling is not needed. If otherwise, the difference in the sample sizes is computed and a new sample of the difference size is drawn from the remaining part of the population that has excluded the observed ones. In one exemplary embodiment of the present invention, the sampling procedure is first carried out through a name list of the individual service transactions first. Subsequently, a manual process is then used to get the corresponding discount rate values.

With rules specified for pricing analysis, the sample mean and the percentage of the samples that fall into a certain range from the sample mean may be computed. If the percentage is no less than a pre-specified threshed value (for example, 90%), then it may be concluded that an acceptable level pricing consistency has been achieved for the population. If the percentage is less than another pre-specified threshed value, which is lower than the first threshed value (for example, 65%), it may be concluded that no consistency exists for the population. If the percentage is between these two extremes, it may be concluded that discount rates tightening is needed, which may result in a recommendation to perform an immediate operational action.

Measuring and controlling the deviation between the sample mean and the population mean in the manner described herein is an effective way of increasing representativeness in the sample relative to the population. When the data has multiple modes (such as having two peaks), the general principle of measuring and controlling the deviations may be adopted, with certain adaptive changes. For instance, when there are distinct groups for the discount rates, such as a positive group and a negative group, the deviation between the sample mean and the population mean in their corresponding parts may be measured and controlled.

For a few special circumstances, the general approach described herein may be adjusted. For example, when making an initial sample size determination without any data on the discount rate likelihood range, a proxy variable may be used. Specifically, field experts' experiences could indicate a strong correlation between the proxy variable and the variability in the data. This assumption could be verified by using some simple correlation and ANOVA analysis. Based on the findings, a multinomial distribution could be used to model the frequencies of the various levels in the proxy variable. From the inferred model, an initial sample size could be derived. When determining a sample size for the zero value subpopulation, getting a good estimate of the sample mean for the population mean is not important because it is known that both are zero. Instead, getting an accurate estimate of the counts of the zeros from the sample for the population is desired. Therefore, the occurrence of zeros can be modeled by a binomial distribution and to provide an additional sample size calculation formula.

Figure 5:
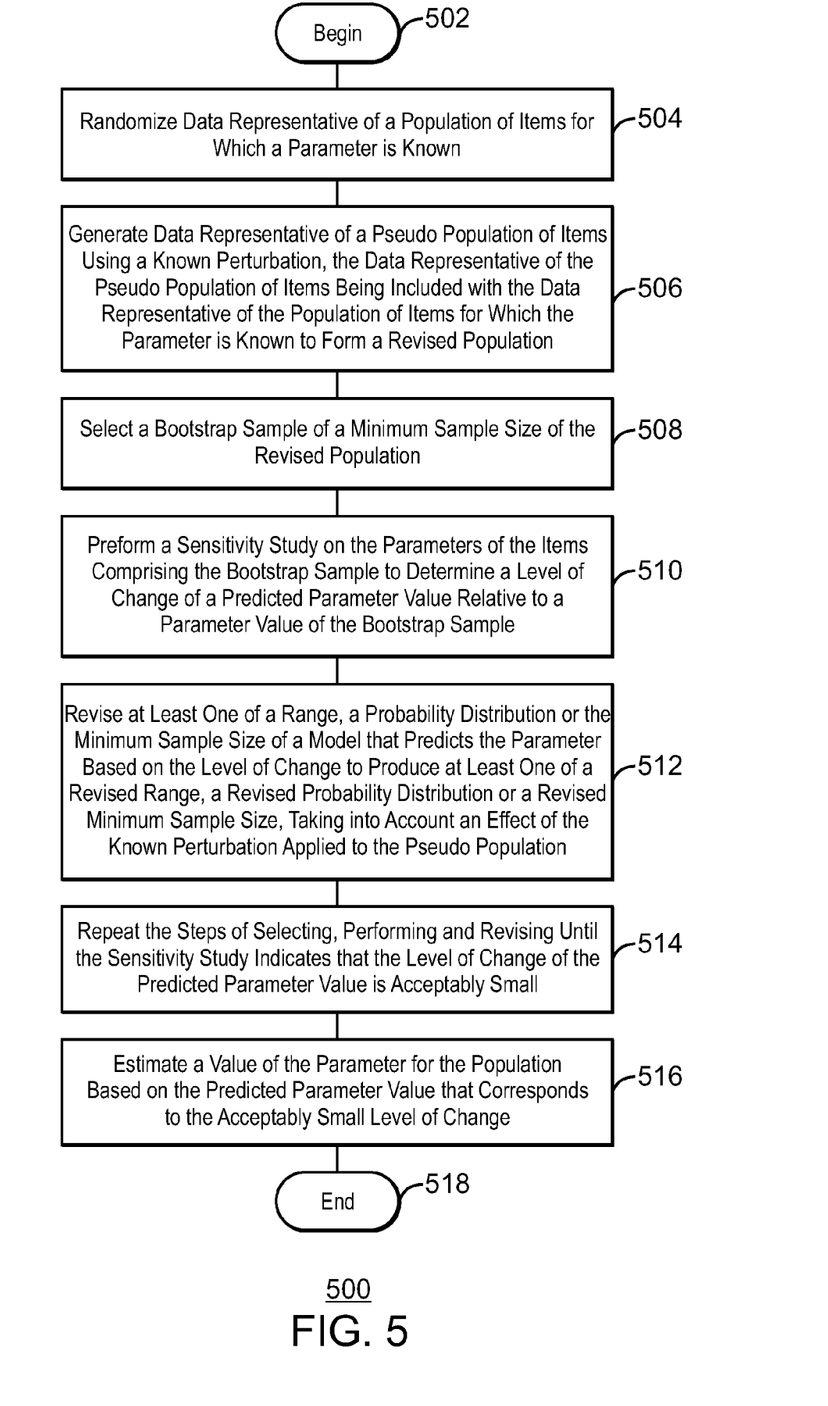
FIG. 5 is a process flow diagram showing a method of estimating a parameter that represents data describing a physical system according to an exemplary embodiment of the present invention.

FIG. 5 is a process flow diagram showing a method of estimating a parameter that represents data describing a physical system according to an exemplary embodiment of the present invention. The method is generally referred to by the reference number 500. At block 502, the method begins.

Data representative of a population of items for which the parameter is known is randomized, as shown at block 504. At block 506, data representative of a pseudo population of items using a known perturbation is generated. In an exemplary embodiment of the present invention, the data representative of the pseudo population of items is included with the data representative of the population of items for which the parameter is known to form a revised population. A bootstrap sample of a minimum sample size of the revised population is selected, as shown at block 508.

At block 508, a sensitivity study is performed on the parameters of the items comprising the bootstrap sample to determine a level of change of a predicted parameter value relative to a parameter value of the bootstrap sample. At block 510, at least one of a range, a probability distribution or the minimum sample size of a model that predicts the parameter based on the level of change to produce at least one of a revised range, a revised probability distribution or a revised minimum sample size is revised, taking into account an effect of the known perturbation applied to the pseudo population. As shown at block 512, the steps of selecting, performing and revising are repeated until the sensitivity study indicates that the level of change of the predicted parameter value is acceptably small. Finally, a value of the parameter for the population is estimated based on the predicted parameter value that corresponds to the acceptably small level of change.

Figure 6:
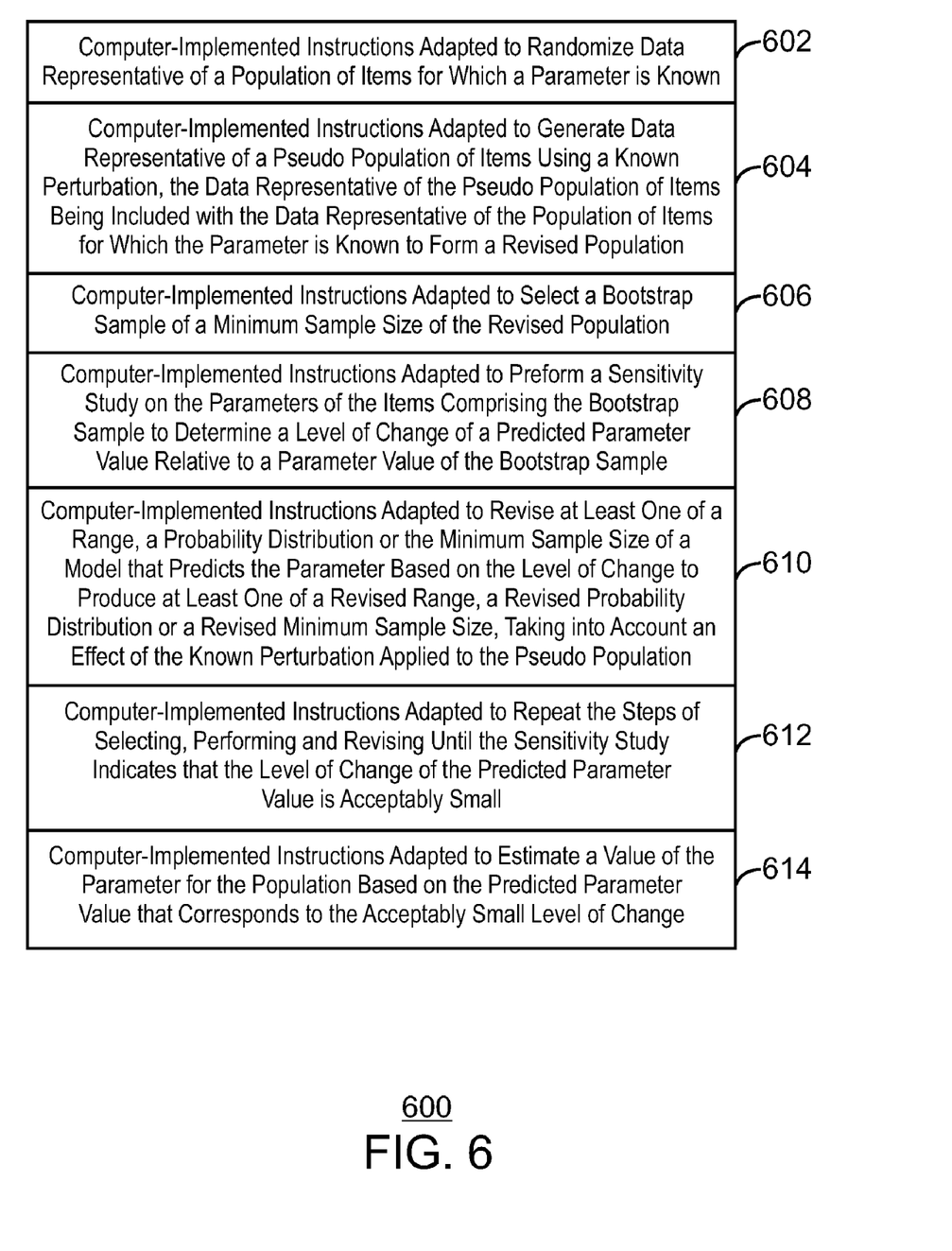
FIG. 6 is a block diagram showing a tangible, machine-readable medium that stores code adapted to estimate a parameter that represents data describing a physical system according to an exemplary embodiment of the present invention.

FIG. 6 is a block diagram showing a tangible, machine-readable medium that stores code adapted to estimate a parameter that represents data describing a physical system according to an exemplary embodiment of the present invention. The tangible, machine-readable medium is generally referred to by the reference number 600. The tangible, machine-readable medium 600 corresponds to any typical storage device that stores computer-implemented instructions, such as programming code or the like. Moreover, the tangible, machine-readable medium 600 may comprise the system memory 106 and/or the hard disk 110 shown in FIG. 1.

A first region 602 of the tangible, machine-readable medium 600 stores computer-implemented instructions adapted to randomize data representative of a population of items for which the parameter is known. A second region 604 of the tangible, machine-readable medium 600 stores computer-implemented instructions adapted to generate data representative of a pseudo population of items using a known perturbation, the data representative of the pseudo population of items being included with the data representative of the population of items for which the parameter is known to form a revised population. A third region 606 of the tangible, machine-readable medium 600 stores computer-implemented instructions adapted to select a bootstrap sample of a minimum sample size of the revised population.

A fourth region 608 of the tangible, machine-readable medium 600 stores computer-implemented instructions adapted to perform a sensitivity study on the parameters of the items comprising the bootstrap sample to determine a level of change of a predicted parameter value relative to a parameter value of the bootstrap sample. A fifth region 610 of the tangible, machine-readable medium 600 stores computer-implemented instructions adapted to revise at least one of a range, a probability distribution or the minimum sample size of a model that predicts the parameter based on the level of change to produce at least one of a revised range, a revised probability distribution or a revised minimum sample size, taking into account an effect of the known perturbation applied to the pseudo population.

A sixth region 612 of the tangible, machine-readable medium 600 stores computer-implemented instructions adapted to repeat the steps of selecting, performing and revising until the sensitivity study indicates that the level of change of the predicted parameter value is acceptably small. Finally, a seventh region 614 of the tangible, machine-readable medium 600 stores computer-implemented instructions adapted to estimate a value of the parameter for the population based on the predicted parameter value that corresponds to the acceptably small level of change.

An exemplary embodiment of the present invention has been tested using population data in which all discount values were known. A sample was selected from the population. The sample mean was within 2% of the population mean. In the sample, more than the pre-specified threshed percentage of the transactions were projected to be within the compliance bands, and in the population, this turned out to be the same. This result and as well as the simulation result indicated that the sampling model works effectively. Subsequent data obtained using an exemplary embodiment of the present invention reflected that low-end repairs tend to be on a fixed fee basis, and repairs for high-end components such as printers, storage devices, and servers tend to be based on hourly rates.

An exemplary embodiment of the present invention could improve the representativeness of a sample relative to a larger population. In addition, the sample mean could be determined to be within a prescribed precision range of the population mean, at a prescribed confidence level. Furthermore, derived value projections in terms of percentages of transactions in the bands can be estimated well.

What is claimed is:

1. A computer-implemented method for estimating via a processor a parameter that represents data describing a physical system, the method comprising:
    randomizing data representative of a population of items for which the parameter is known, wherein the parameter corresponds to price consistency, and the physical system comprises at least one of a hardware element or a service element with respect to a networked information technology system;
    generating data representative of a pseudo population of items using a known perturbation that provides a mean level shift of the parameter, the data representative of the pseudo population of items being included with the data representative of the population of items for which the parameter is known to form a revised population;
    selecting a bootstrap sample of a minimum sample size of the revised population;
    performing a sensitivity study on the parameter of the items comprising the bootstrap sample to determine a level of change of a predicted parameter value relative to a parameter value of the bootstrap sample;
    revising at least one of a range, a probability distribution or the minimum sample size of a model that predicts the parameter based on the level of change to produce at least one of a revised range, a revised probability distribution or a revised minimum sample size, taking into account an effect of the known perturbation applied to the pseudo population;
    repeating the steps of selecting, performing and revising until the sensitivity study indicates that the level of change of the predicted parameter value is acceptably small; and
    estimating via the processor a value of the parameter for the population based on the predicted parameter value that corresponds to the acceptably small level of change.

2. The method recited in claim 1, wherein the known perturbation comprises random noise.

3. The method recited in claim 1, wherein the physical system comprises a financial system.

4. The method recited in claim 1, wherein the parameter corresponding to price consistency comprises a sales discount rate.

5. The method recited in claim 1, wherein the known perturbation comprises noise generated by a Gaussian process.

6. The method recited in claim 1, wherein the data representative of the pseudo population resembles aspects of the data representative of the original population but with the known perturbation reflecting uncertainty about the data representative of the population.

7. A computer system for estimating a parameter that represents data describing a physical system, the computer system comprising:
    a processor that is adapted to execute stored instructions; and
    a memory device that stores instructions that are executable by the processor, the instructions comprising:
        computer-implemented instructions adapted to randomize data representative of a population of items for which the parameter is known, wherein the parameter corresponds to price consistency, and the physical system comprises at least a hardware element or a service element, or a combination thereof, regarding a networked information technology system;
        computer-implemented instructions adapted to generate data representative of a pseudo population of items using a known perturbation comprising random noise generated by a Gaussian process, the data representative of the pseudo population of items being included with the data representative of the population of items for which the parameter is known to form a revised population;
        computer-implemented instructions adapted to select a sample of a minimum sample size of the revised population;
        computer-implemented instructions adapted to perform a sensitivity study on the parameter of the items comprising the sample to determine a level of change of a predicted parameter value relative to a parameter value of the sample;
        computer-implemented instructions adapted to revise at least one of a range, a probability distribution or the minimum sample size of a model that predicts the parameter based on the level of change to produce at least one of a revised range, a revised probability distribution or a revised minimum sample size, taking into account an effect of the known perturbation applied to the pseudo population;
        computer-implemented instructions adapted to repeat the steps of selecting, performing and revising until the sensitivity study indicates that the level of change of the predicted parameter value is acceptably small; and
        computer-implemented instructions adapted to estimate a value of the parameter for the population based on the predicted parameter value that corresponds to the acceptably small level of change.

8. The computer system recited in claim 7, wherein the physical system comprises a financial system.

9. The computer system recited in claim 7, wherein the parameter corresponding to price consistency comprises a sales discount rate.

10. The computer system recited in claim 7, wherein the known perturbation provides a mean level shift of the parameter.

11. The computer system recited in claim 7, wherein the data representative of the pseudo population resembles aspects of the data representative of the original population but with the known perturbation reflecting uncertainty about the data representative of the population.

* * * * *